United States Patent
Holland et al.

(10) Patent No.: US 8,613,426 B1
(45) Date of Patent: Dec. 24, 2013

(54) POWER LINE PULLER CONTROL PACKAGE

(75) Inventors: Raymond Holland, Indianapolis, IN (US); Joshua R. Holland, Greenwood, IN (US); James G. Miller, Alvin, TX (US)

(73) Assignee: L.E. Myers Co., Indianapolis, IN (US)

( * ) Notice: Subject to any disclaimer, the term of this patent is extended or adjusted under 35 U.S.C. 154(b) by 981 days.

(21) Appl. No.: 12/637,323

(22) Filed: Dec. 14, 2009

(51) Int. Cl.
*H02G 3/22* (2006.01)
*H02G 1/06* (2006.01)
*H02G 1/08* (2006.01)

(52) U.S. Cl.
USPC ........ 254/134.3 FT; 254/134.4; 254/134.3 R; 242/615

(58) Field of Classification Search
USPC ....... 254/134.3 FT, 134.4, 134.3 R, 278, 342, 254/344, 323, 267, 273; 60/450, 452; 242/615
See application file for complete search history.

(56) References Cited

U.S. PATENT DOCUMENTS

| | | | |
|---|---|---|---|
| 2,805,042 A * | 9/1957 | O'Leary | 173/4 |
| 3,091,434 A * | 5/1963 | Monitor | 254/327 |
| 3,912,093 A * | 10/1975 | Kruschke | 414/542 |
| 4,200,052 A | 4/1980 | Cunningham et al. | |
| 4,323,222 A | 4/1982 | Dempster et al. | |
| 4,482,133 A | 11/1984 | Bishop | |
| 4,508,281 A | 4/1985 | Plater | |
| 4,537,364 A | 8/1985 | Pollman et al. | |
| 4,588,142 A | 5/1986 | Malzacher | |
| 4,624,450 A | 11/1986 | Christison | |
| 4,692,063 A | 9/1987 | Conti | |
| 4,767,073 A | 8/1988 | Malzacher | |
| 4,854,547 A | 8/1989 | Oliphant | |
| 5,114,119 A | 5/1992 | Theurer et al. | |
| 5,351,430 A | 10/1994 | Hystad | |
| 6,467,715 B2 | 10/2002 | Go | |
| 6,497,380 B2 * | 12/2002 | Kigawa et al. | 242/390.8 |
| 6,585,232 B2 | 7/2003 | Rechenmacher et al. | |
| 6,864,650 B2 | 3/2005 | Heravi et al. | |
| 7,004,456 B2 | 2/2006 | Newman | |
| 7,063,306 B2 | 6/2006 | Sanders et al. | |
| 7,093,433 B2 * | 8/2006 | Belluschi | 60/450 |
| 7,166,061 B2 | 1/2007 | Shimomura et al. | |
| 7,175,163 B2 * | 2/2007 | Blanc | 254/278 |
| 7,201,366 B2 | 4/2007 | Sanders et al. | |
| 7,364,136 B2 * | 4/2008 | Hossler | 254/278 |
| 7,454,904 B2 | 11/2008 | Belluschi | |
| 7,712,726 B1 * | 5/2010 | Jernigan | 254/134.3 FT |
| 7,963,505 B2 * | 6/2011 | Taylor et al. | 254/286 |

(Continued)

FOREIGN PATENT DOCUMENTS

| | | | | |
|---|---|---|---|---|
| JP | 54008356 A | * | 1/1979 | B66D 3/22 |
| JP | 57086655 A | | 5/1982 | |

(Continued)

*Primary Examiner* — Phi A
(74) *Attorney, Agent, or Firm* — Mathew R. P. Perrone, Jr.; Mark J. Hanson

(57) ABSTRACT

A power line puller control package facilitates the installation of conductor or high tension power lines by directing the conductor or high tension line removal from at least one supply reel at a substantially stable rate, while adjusting the speed of the drum to the amount of the rope or cable on the at least one holding drum, to facilitate manufacturing, installation or use of the high tension power line at a substantially constant speed and tension.

22 Claims, 11 Drawing Sheets

(56) References Cited

U.S. PATENT DOCUMENTS

| | | | |
|---|---|---|---|
| 8,251,351 B2 * | 8/2012 | Roodenburg et al. | 254/297 |
| 2006/0231812 A1 * | 10/2006 | Ziech et al. | 254/278 |
| 2007/0089925 A1 | 4/2007 | Addleman | |
| 2008/0061276 A1 | 3/2008 | Averill et al. | |

FOREIGN PATENT DOCUMENTS

| | | | | | |
|---|---|---|---|---|---|
| JP | 06032590 A | * | 2/1994 | | B66D 1/46 |
| JP | 06056392 A | * | 3/1994 | | B66D 1/60 |
| JP | 06086419 A | * | 3/1994 | | H02G 1/02 |

* cited by examiner

POWER LINE PULLER CONTROL PACKAGE

This invention relates to a power line puller control package and, more particularly, to a power line puller control package which permits installation of a power line in an efficient and safe manner, and at a substantially constant rate of speed and line tension.

BACKGROUND OF THE INVENTION

Many problems exist with the installation of electrical transmission, distribution, or underground lines. Electrical transmission, distribution, and underground lines are commonly referred to as "conductors." Conductors transport electrical energy from a generation source to at least one distribution point, and from distribution points to end users. These types of conductors are heavy, have large diameters, and are difficult to handle. Conductors are typically composed of aluminum bands wound around a steel core.

Conductors can be damaged if they come in contact with the ground or other objects. Therefore, tension conductor stringing, as opposed to slack conductor stringing, is generally the only acceptable method of installing conductors. During tension stringing, conductors can be damaged if tension beyond the specified maximum is applied during installation. It is desirable to install conductors in a more efficient, controlled, and safe manner. In addition, it is critical that conductor tension specifications are not exceeded.

In addition to conductors, fiber optic systems are also installed on transmission lines and distribution systems. Types of fiber optic systems include optical ground wire (OPGW), all dielectric, self supporting (ADSS) cables and optical fiber installed in high-density polyethylene (HDPE) conduits. These types of cables are generally more susceptible to damage from excess tension.

Conductor installation using the tension stringing process involves the removal of conductor from a supply reel at a speed and tension within specified parameters. Prior to stringing operations, towers or poles (hereinafter referred to as "structures") are installed. The structures have several arms to which insulator strings are attached. Stringing blocks, which are large wheels or "sheaves" attached to a housing, are connected to the insulator strings. Hard line cable is unwound from the hard line drum puller and placed in the stringing blocks for a section of structures. When installing a smaller diameter conductor, pulling rope may be used in place of hard line cable.

At the opposite end of the rope or hard line cable drum puller, reels of conductor are mounted on reel stands. After the hard line is installed, it is attached to the conductor. The hard line is then recoiled, pulling the conductor back through the stringing blocks. This is often referred as the "pulling" operation. When stringing or pulling is complete, the line is said to be "pulled in." Once pulled in, the stringing blocks are removed and the conductor is attached or "clipped in" to the structures.

During the pulling operation, power to the drum must be continuously adjusted to maintain the speed of the conductor and to maintain constant tension on the conductor as it moves through the stringing blocks. Continuous adjustments to power are necessary because of the continuous change in the diameter of the pulling drum as the pulling line is retrieved thereby causing conductor to be removed from the conductor supply reel. Excessive tension during installation can damage the conductor. A damaged conductor can cause voltage drops, corona losses, reliability issues, and catastrophic failure. Therefore, it is essential to maintain a constant pulling tension within the design parameters. In addition, a conductor can jam in a stringing block. Without a mechanism to automatically sense the increase in tension and make adjustments, including shutting down the pull if necessary, structures and equipment can be severely damaged.

The delays to a project caused by a conductor jam in a stringing block can be excessive. A damaged conductor may have to be removed and replaced. If a structure is damaged, the structure may have to be replaced. This may entail time to order and manufacture a new section as well as the time needed to perform the replacement.

SUMMARY OF THE INVENTION

Among the many objectives of the present invention is the provision of a power line puller control package for a conductor to be mounted on a series of electrical transmission towers that can maintain constant conductor tension and speed during a pull.

A further objective of the present invention is the provision of a power line puller control package that automatically prevents maximum tension parameters from being exceeded.

Another objective of the present invention is the provision of a power line puller control package, which automatically adjusts to the diameter of the pulling line wrap on at least one pulling drum or at least one cable drum.

Yet another objective of the present invention is the provision of a power line puller control package, which adjusts to the weight of the pulling line on at least one pulling drum.

Still another objective of the present invention is the provision of a power line puller control package, which records the tension on the conductor as it is pulled.

Also an objective of the present invention is the provision of a power line puller control package, which controls pulling of conductor through stringing blocks.

A further objective of the present invention is the provision of a power line puller control package, which prevents undue stress on structures supporting the conductor.

Still another objective of the present invention is the provision of a power line puller control package that will automatically stop the pull when maximum tension parameters are reached.

These and other objectives of the invention (which other objectives become clear by consideration of the specifications, claims, and drawings as a whole) are met by controlling the rope or hard line cable retrieval to maintain a substantially constant rate and constant tension, by adjusting the speed of the reel or drum to the amount of the pulling line wrap on at least one pulling drum. This facilitates installation of conductors by automatically controlling the speed and tension on the conductor as it is being pulled through stringing blocks. This invention can also be used in cable manufacturing by adjusting the system to maintain constant conductor tension when manufactured cable is wound on to supply reels.

BRIEF DESCRIPTION OF DRAWINGS

Throughout the figures of the drawings, where the same part appears in more than one figure of the drawings, the same number is applied thereto.

DESCRIPTION OF THE PREFERRED EMBODIMENTS

Figure 1:
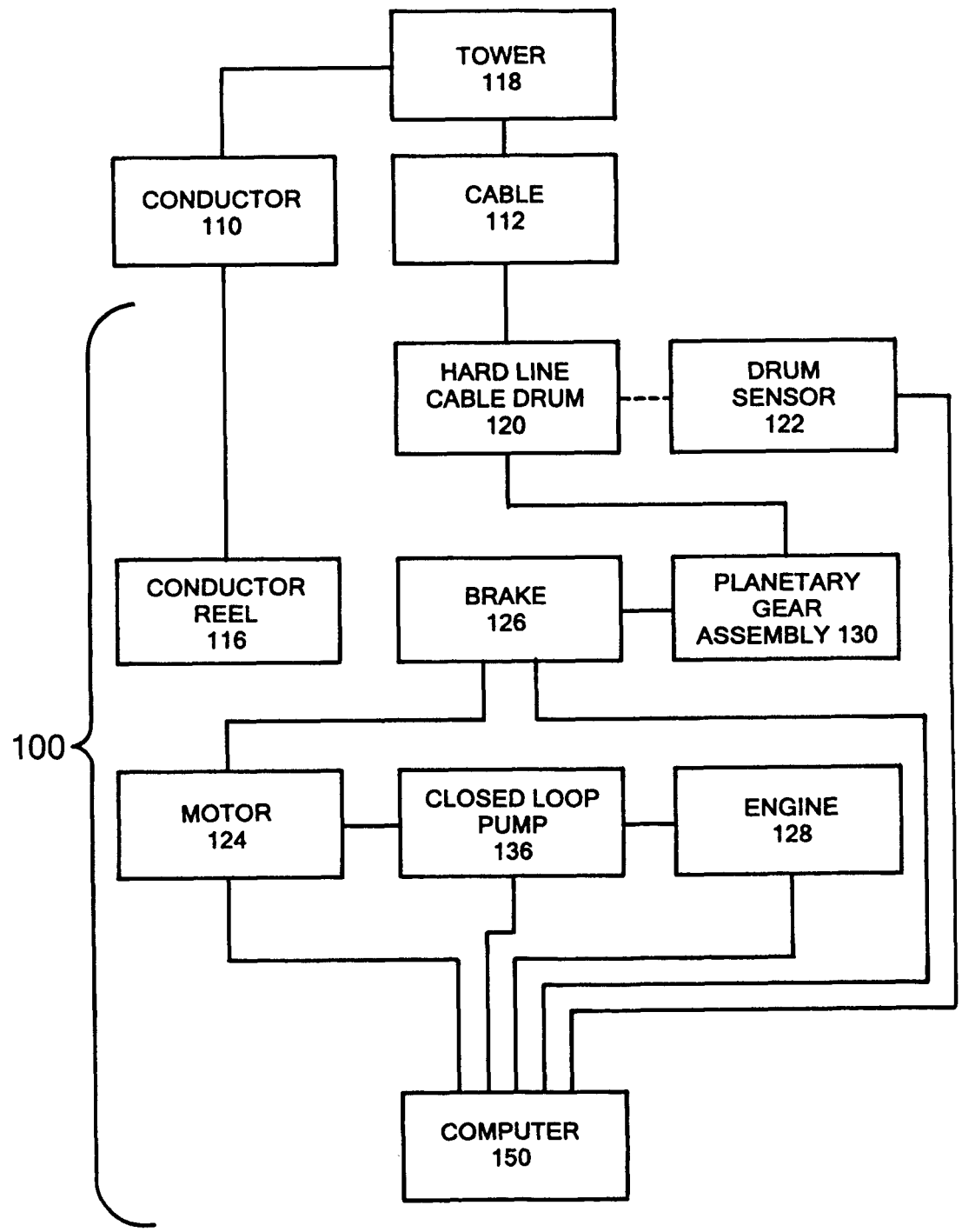
FIG. 1 depicts a block diagram of the power line puller control package 100 of this invention.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, down, over, above, below, beneath, rear, and front, may be used with respect to the drawings. These and similar directional terms are not to be construed to limit the scope of the invention in any manner. The words attach, connect, couple, and similar terms with their inflectional morphemes do not necessarily denote direct or intermediate connections, but may also include connections through mediate elements or devices.

The power line puller control package of this invention provides for a safer, faster, and more efficient installation of transmission, distribution, or underground electric power lines, ("conductors"), from one or more supply reels, whether a hard line cable is required for the heavier conductor, or rope is used for the lighter conductor. Unless otherwise specified, hard line cable and rope are used interchangeably herein. More particularly, the power line puller control package provides these and other benefits when used in the tension stringing installation process as set forth above.

The power line control package provides several benefits during the installation process. These include maintaining a constant conductor speed as it travels through the stringing blocks, maintaining a constant tension on the conductor as it travels through the stringing blocks, preventing excessive tension on the conductor, and providing an automatic system shut down if the conductor becomes stuck in one of the stringing blocks. In addition, the power line control system can be used to record the actual amount of tension placed on the conductor during the pulling process.

Information from various parts of the puller control package is used to continuously adjust the speed of the hard line cable drum by compensating for the diameter changes on the drum as the hard line is reeled in. Also, in a manufacturing setting, this power line control package can assist in the efficient placing of the conductor as manufactured onto the reels for distribution.

The power line puller control package is a single or multi drum power line puller. During operation, one drum is engaged at a time by an operator manually or automatically connecting the drum to a drive axle and releasing or setting the brake. The prime mover is a diesel engine driving a closed loop pump which, in turn operates a motor, preferably a hydraulic motor. The output of the motor is connected through gear reduction. The control program for the computer calculates line speed and line pull, limiting these values to a maximum line speed and a maximum line pull.

Figure 3:
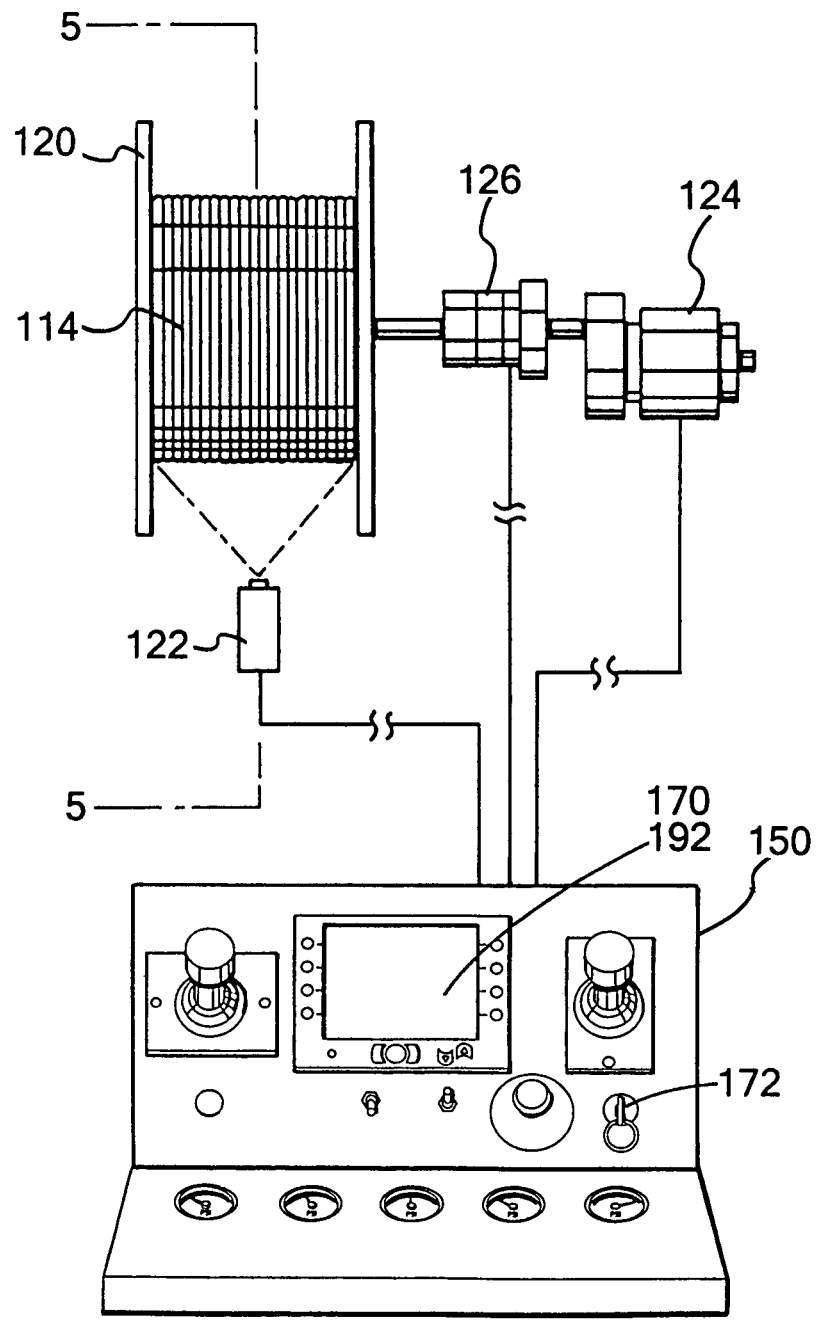
FIG. 3 depicts a perspective view of the power line puller control package 100 of this invention isolated to first drum of cable holding drum 120.

Turning now to FIG. 1, the power line puller control package 100 pulls the conductor 110 from conductor reel 116 onto tower 118. Computer 150 receives readouts from various parts of the puller control package 100 to adjust the speed of the hard line cable or rope holding drum 120 in order to control the pull on the hard line cable 112 or rope 114 (FIG. 3) and thus the conductor 110 is strung on tower 118 as hard line cable 112 recoils on the cable holding drum 120 at a substantially linear constant rate within desired parameters by compensating for the diameter and weight changes of the conductor 110, by measuring the wrap of the hard line cable 112 on the cable holding drum 120, pursuant to adjustments by computer 150. A drum sensor 122 measures the diameter of the wrap of the hard line cable 112 on cable holding drum 120 and feeds the information to the computer 150. In so doing the conductor reel 116 has conductor 110.

An engine 128, preferably a diesel engine, is connected to a closed loop pump 136. The closed loop pump 136 is connected to a motor 124. Then motor 124 is connected to a brake 126. Between the brake 126 and the cable holding drum 120 is planetary gear assembly 130.

Computer 150 directly receives and coordinates data from engine 128, closed loop pump 136, motor 124, brake 126 and drum sensor 122. This data is tabulated and the speed of the drum 120 is measured and adjusted by the data tabulation of the computer 150 according to predetermined parameters. Computer 150 compares the data from each source and appropriately applies the motor 124 as desired, to keep the speed of cable 112 recoiling on the hard line cable holding drum 120 substantially constant, for safer installation of the conductor 110.

Figure 2:
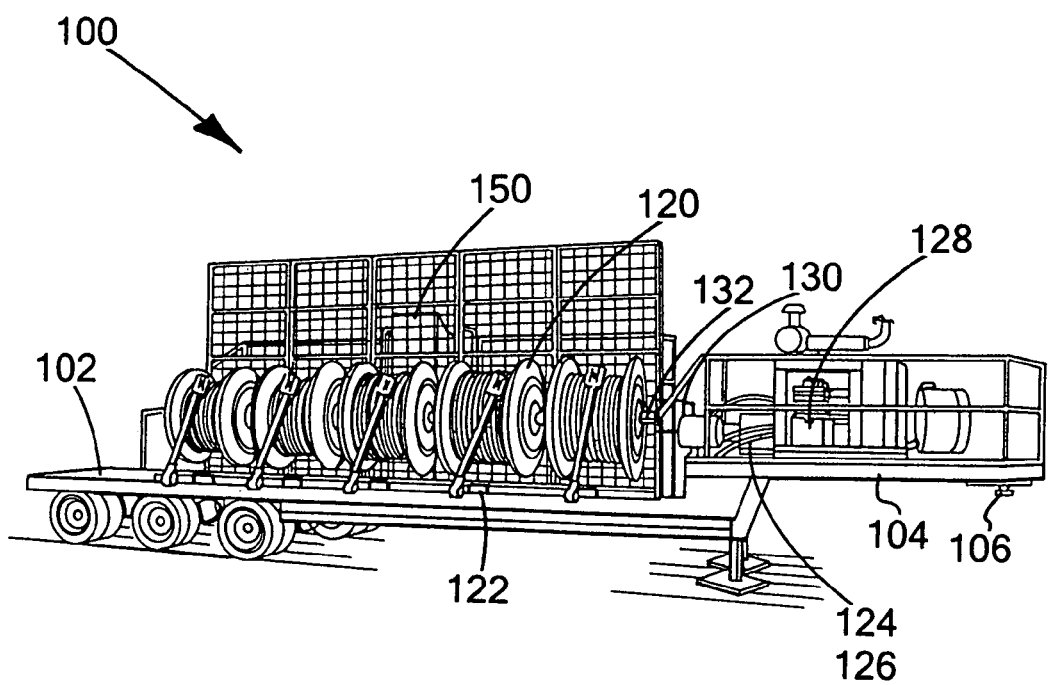
FIG. 2 depicts a perspective view of the power line puller control package 100 of this invention mounted on a flat bed trailer 102.

Turning now to FIG. 2, the axle 132 is connected to motor 124 through a chain drive, which selectively operates each one of the drums 120 for the multi reel power line puller control package 100. The multi-drum power line puller control package 100 and other equipment may be mounted on a flat bed trailer 102 which has towing neck 106 to assist in transport. The rope or hard line cable holding drums 120 are mounted on the support bed 104 of trailer 102, while the computer 150 is mounted above the drums 120 on the trailer 102. During operation, one drum 120 is engaged at a time by an operator, who manually or automatically connects the drum 120 to the drive axle 132 and releasing or setting the brake 126. The prime mover is a diesel engine 128 driving a closed loop pump 136, which operates a motor 124. The output of the motor 124 is connected through a planetary gear assembly 130. The control program for computer 150 will calculate line speed and line pull or tension of cable 112 and conductor 110, limiting these values to a maximum line speed and maximum line pull.

Figure 4:
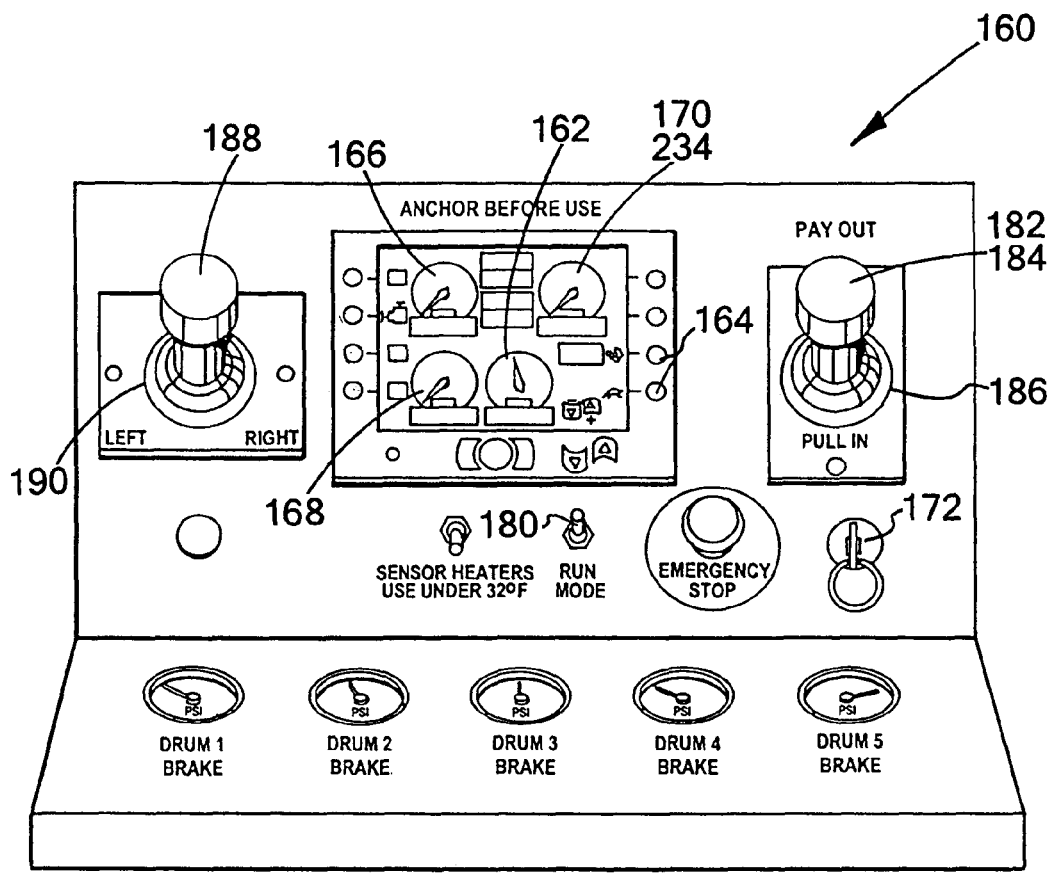
FIG. 4 depicts a perspective view of the control panel 160 for computer 150 used with the power line puller control package 100 of this invention.
Figure 6:
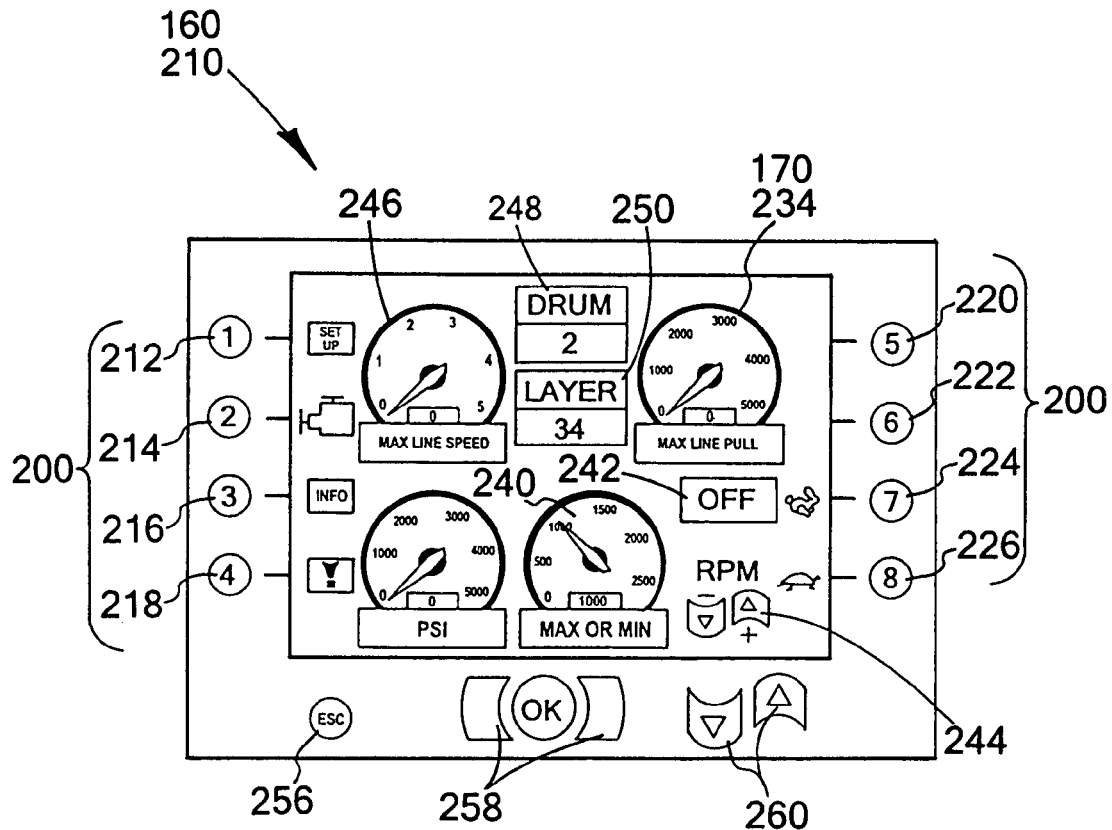
FIG. 6 depicts a computer screen view 210 for the power line puller control package 100 of this invention.

In FIG. 4, control panel 160 for computer 150, illustrates how the power line puller control package 100 operates. Engine revolutions per minute 162 is to be controlled with display push buttons 164. Communication values displaying engine parameters of miles per hour 166, pounds per square inch 168, line pull 170, are situated in a control panel 160. Additional inputs will be monitored for warning or shut down conditions of the hydraulic system. In FIG. 6, pressing third soft button 216 will display an information page which will provide real time values of the hydraulic system 176.

To engage the motor 124 and spin the axle 132, a run mode or enable switch 180 must be in the "on" position. A center lock, friction held joystick 182, which has joystick output 186, will be used to operate the motor 124 in a forward manner or a reverse manner, as desired or necessary. The joystick 182 has a neutral switch 184. With no inputs in the fault condition, the adjustable max line pull and max speed will be limited by the readout comparisons.

Figure 5:
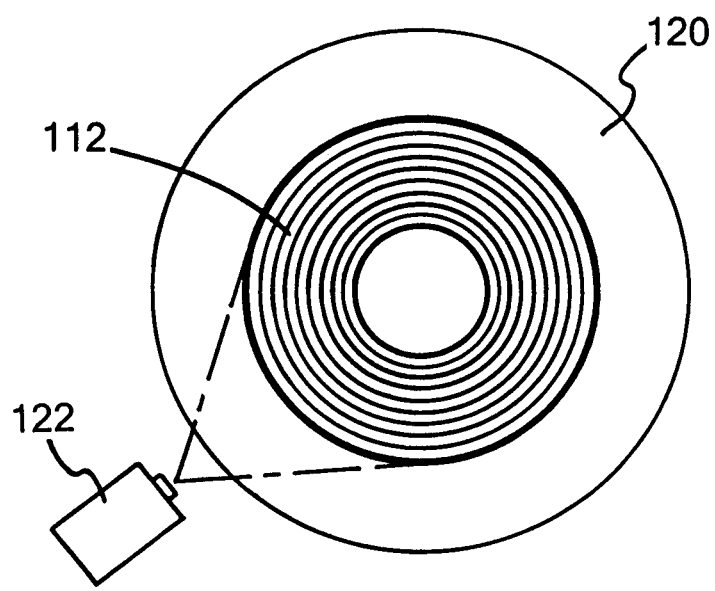
FIG. 5 depicts a side, cut away view of first drum of cable holding drum 120 with sensor 122 for the power line puller control package 100 of this invention.

In FIG. 5 cable holding drum 120 has a sensor 122 for the power line puller control package 100 of this invention. Sensor 122 assists in the determination of how much cable or rope is left on drum 120.

Figure 7:
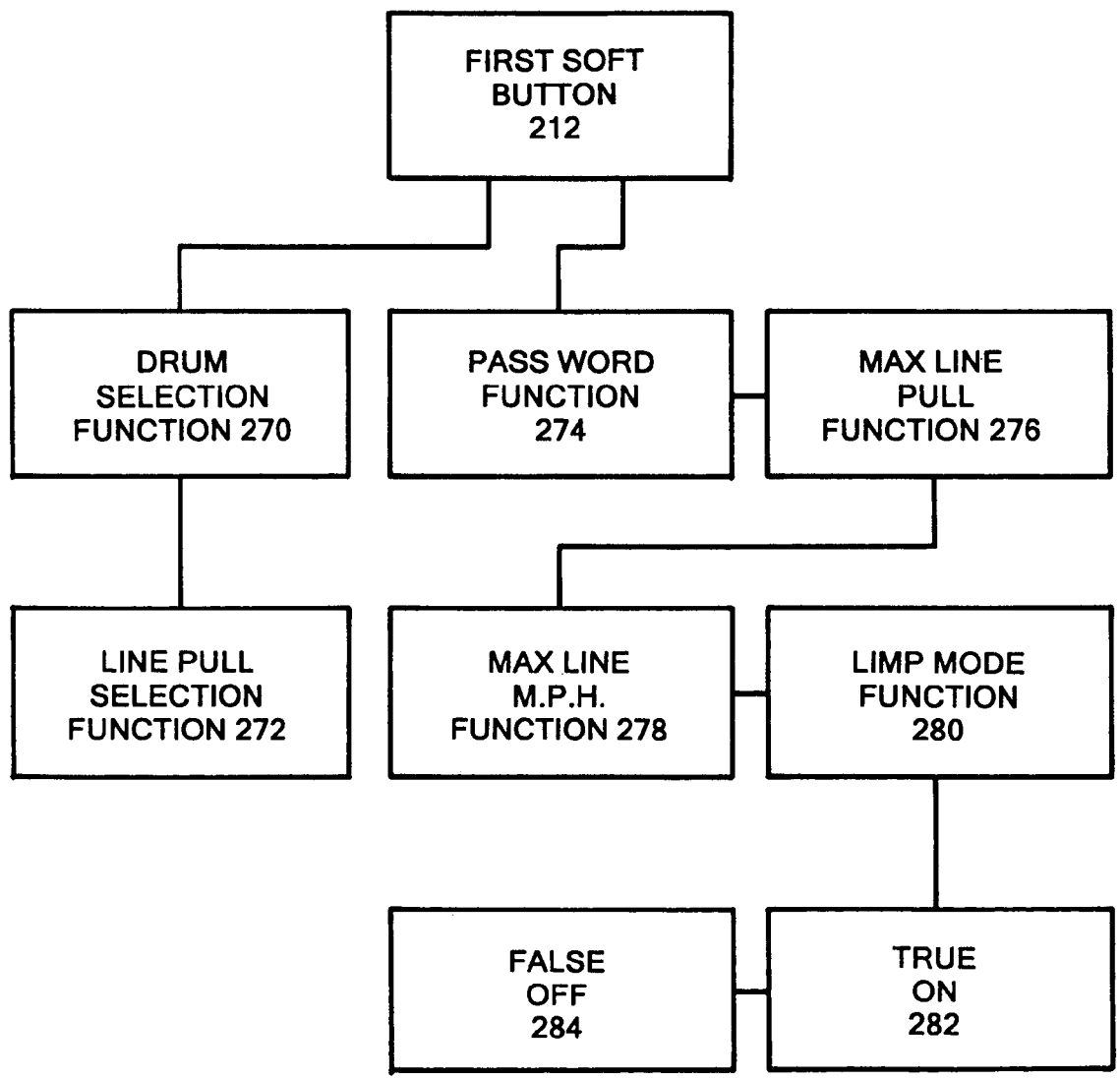
FIG. 7 depicts a computer set up method for the power line puller control package 100 with the first soft button 212 of this invention.

Turning to FIG. 7, a limp mode 280 is to be included to operate at 50 percent of the maximum power if readout inputs are in fault condition. Enablement of limp mode 280 is done in a setup screen 192 of computer 150 with password protection.

Turning now to FIG. 6, computer screen view 210 depicts a standard procedure for operating the power line puller control package 100. First soft button 212 provides a drum selection function 270 for any of the cable holding drums 120 (FIG. 2). Second soft button 214 operates and controls the diesel engine 128. Third soft button 216 controls various readouts during the operation of power line puller control package 100. Fourth soft button 218 provides access to the fault modes 230 of power line puller control package 100.

Fifth soft button 220, sixth soft button 222 as well as the first soft button 212, second soft button 214, third soft button 216, fourth soft button 218, seventh soft button 224, and eighth soft button 226 provide for the insertion of protective passwords for using computer 150. Seventh soft button 224 relates to maximum engine revolutions (RPM) per minute and RPM gage 240, and cooperates with eighth soft button 226 which relates to idle engine 128, especially in an idle mode.

Also within computer screen view 210 is operation button 242 situated below line pull gage 234, and above RPM adjustment switch 244. Line speed indicator 246 is adjacent to first soft button 212. Drum indicator 248 indicates which of the drums 120 is being used, and is positioned between line speed indicator 246 and line pull gage 234. Layer indicator 250 is also positioned between line speed indicator 246 and line pull gage 234, and below drum indicator 248.

Below the screen view indicators are, from left to right, the escape button 256, the adjustment button 258, and the direction buttons 260. In this manner, minor adjustments can be made. While other arrangements for FIG. 6 are possible, this arrangement has proven to be the most efficient.

With the addition of FIG. 7, first soft button 212 for the power line puller control package 100 is further defined. Drum selection function 270 feeds from first soft button 212 and into first soft line pull selection function 272. Also extending from soft button 212, is the password function 274. Password function 274 controls the access to the max line pull function 276, the max line miles per hour (M.P.H.) function 278, and the limp mode function 280. Once these three functions are set, a password is required to make any changes.

Figure 8:
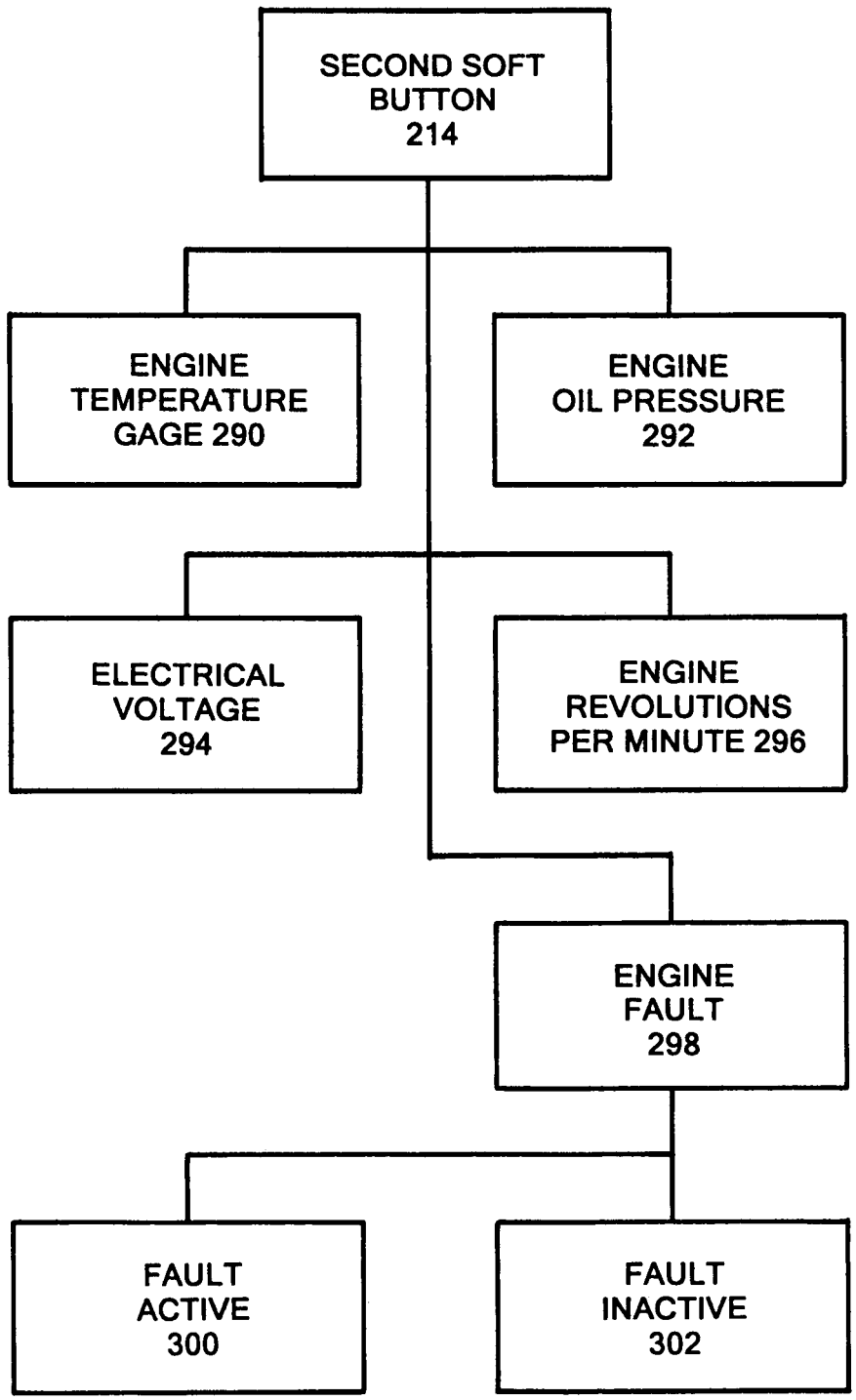
FIG. 8 depicts a computer set up method with second soft button 214 for the power line puller control package 100 of this invention.

Adding FIG. 8 to the consideration, computer 150 is set up with second soft button 214 for the power line puller control package 100. More particularly, second soft button 214 activates engine temperature gauge 290, engine oil pressure 292, electrical voltage 294, and engine revolutions per minute 296, each of which preferably includes a flashing light indication upon deviation from the desired parameters. Computer 150 (FIG. 1) compares the activated parameter to determine and confirm that preset guidelines are met within the desired parameters. As those parameters are constantly monitored, information is fed to engine fault 298. Engine fault 298 becomes fault active 300 if the parameters of safe operation as programmed into the computer 150 are not met, so that the operation of power line puller control package 100 ends until the problem is corrected. Engine fault 298 becomes fault inactive 302 if the desired parameters at one time were not met, but problems were corrected (history of active codes).

Figure 9A:
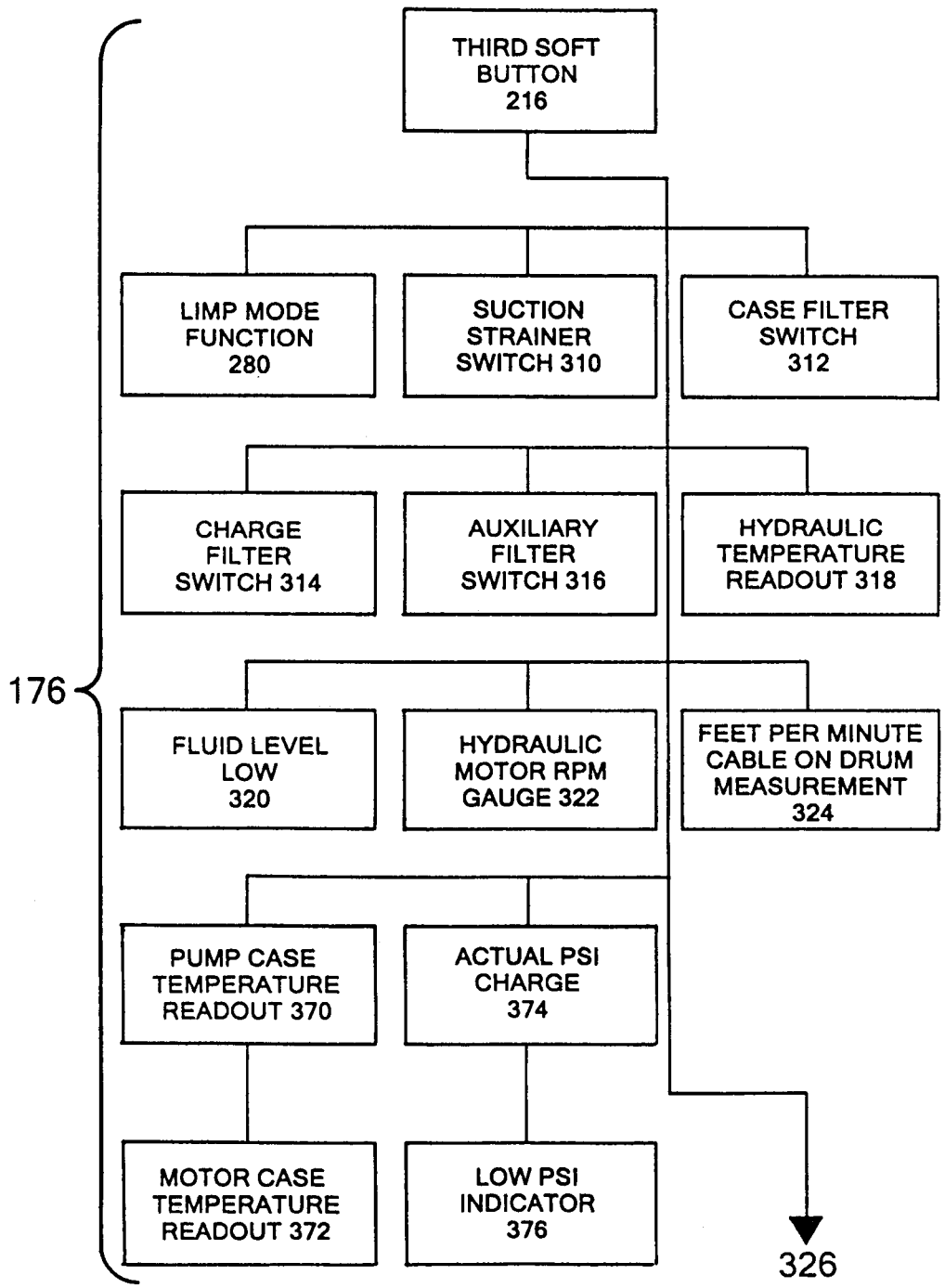
FIG. 9a and FIG. 9b combine to depict a computer set up method with third soft button 216 for the power line puller control package 100 of this invention.

FIG. 9a verifies a computer set up method for computer 150 with third soft button 216 for the power line puller control package 100 which adjusts the main screen of computer 150 (FIG. 1). Third soft button 216 activates a series of screen functions, such as the limp mode function 280, and provides a screen readout on the functioning thereof. Other features covered include the suction strainer switch 310, the case filter switch 312, the charge filter switch 314 and the auxiliary filter switch 316. Such readouts verify the working functions of the switches.

In a like fashion, hydraulic temperature readout 318, fluid level indicator 320, hydraulic motor rpm gauge 322 and feet per minute cable on drum measurement 324 provide gauges or similar indicators to show readings and provide a comparison with the preset computer readout.

Figure 9B:
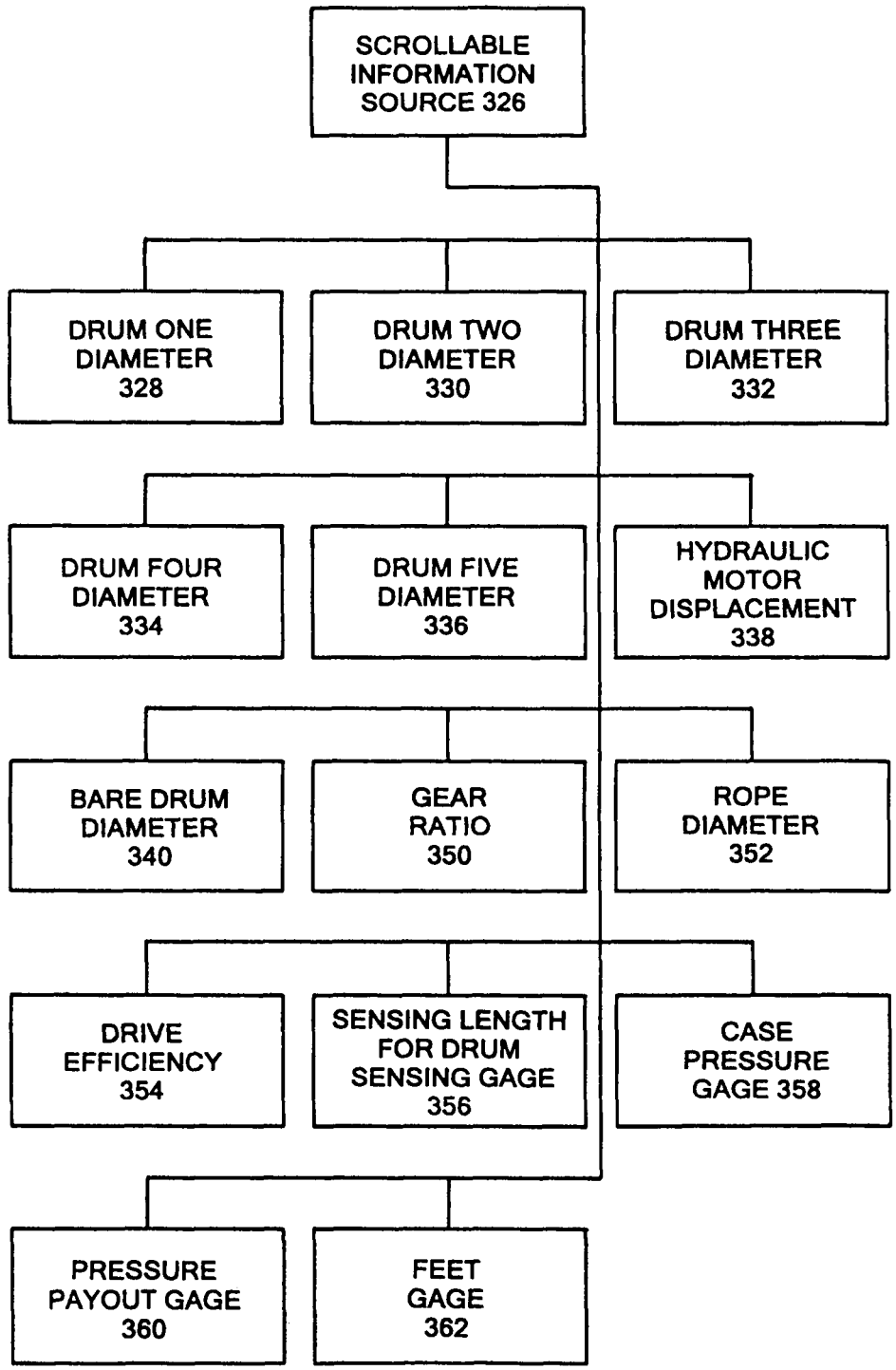

Turning to FIG. 9b third soft button 216 also provides for a scrollable information source 326, to provide screen readouts for various other factors with the program for computer 150 (FIG. 1). There are readouts for drum one diameter 328, drum two diameter 330, drum three diameter 332, drum four diameter 334, drum five diameter 336, and any other drum which may be present. With this information, the diameter of cable 112 (FIG. 3) on any drum can be determined. This in turn leads to determination of the amount thereon, pursuant to the computer 150.

With the hydraulic motor displacement readout 338 (FIG. 9b), the information on amounts and rates of cable 112 (FIG. 1), combined with the bare drum diameter 340 (FIG. 9b) knowledge thereon or paid out can be determined. When the gear ratio 350 of the planetary gear assembly 130 (FIG. 1), is considered further control is achieved. For the other measurements like rope diameter 352, drive efficiency 354, sensing length for drum sensors gage 356, case pressure gage 358, pressure payout gage 360, and feet gage 362 similar actions are possible.

Turning back to FIG. 9a, third soft button 216 also accesses a pump case temperature readout 370, a motor case temperature readout 372, the actual psi charge 374, and the low psi indicator 376. With the proper preset parameters, computer 150 analyzes all of these factors and provides tremendous control for pulling conductor 110 (FIG. 1), with a clear recording of the tension and speed of the conductor 110 as it is positioned. Thus, conductor 110 can be positioned for use with great efficiency.

Figure 10:
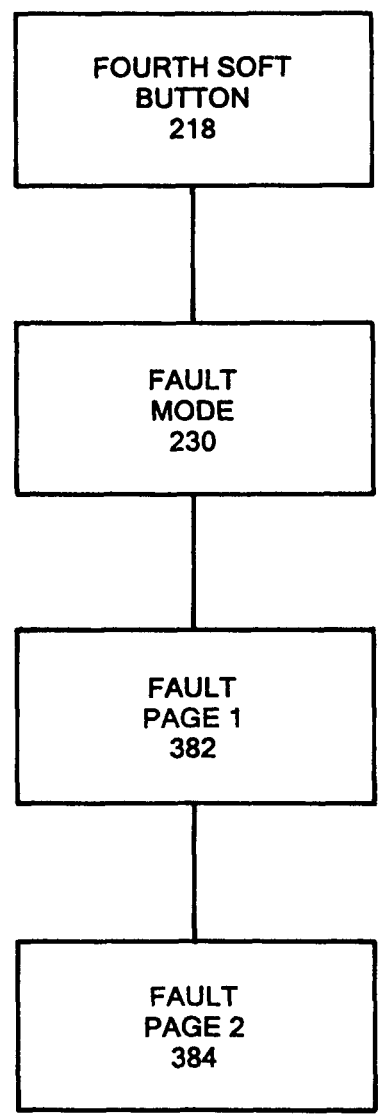
FIG. 10 depicts a computer set up method with fourth soft button 218 for the power line puller control package 100 of this invention.

In FIG. 10, fourth soft button 218 provides a diagnostic system for the power line puller control package 100 of this invention, with a fault system for functions thereof. A first fault page 382 can display up to 24 faults on the hydraulic system 176 (FIG. 1) while the second fault page 384 can display up to 24 different faults for the hydraulic system 176, thereby providing even more control for the installation of a conductor with a cable 112.

When considering the figures together inputs required for calculating line pull and line speed are:

1) Drum 120 with the cable diameter measured by an ultrasonic drum sensor 122;

2) Motor 124 hydraulic pressure measured with a pressure transducer; and

3) Motor Speed measured with pulse pick up unit (hereinafter "PPU") frequency input.

PPU is the method of measuring the rotation of the drive motor. An electromagnetic pulse pick-up unit, particularly for use in flow meters having small nominal width, has a pair of magnets arranged at opposite locations and with opposite polarity in a measuring gear of the flow meter. Concentrically arranged with the axis of rotation of the gear, there is provided a sensing unit assembled of a central pick-up cylinder, a sensing coil arranged around the portion of the cylinder facing the magnet, and a plurality of Wiegand wires distributed side by side in axial direction on the cylindrical outer surface of the pick-up cylinder in close proximity to the sensing coil. A pole ring of magnetically conductive material short circuits the ends of the Wiegand wires remote from the magnets.

Memory variables for the motor 124 include motor displacement, drive ratio, drum diameter, cable winding diameter, and PPU frequency. The efficiency multiplier may be checked, so that wear and tear on the power line puller control package 100 can be determined efficiently. The rope or cable layer calculation is to be made utilizing the calculated pull radius minus the drum radius divided by the rope diameter. Layer number will be displayed.

To assist engagement of a given drum 120 through a planetary gear assembly 130 and the drive axle 132 is a Bump input which will allow pump flow at an eeMemory selected value. By Bump is meant a feature written into the code enabling the turning the drum remotely without using the joystick. There will be a Bump FWD (forward) and Bump (reverse) REV. This will be allowed in the setup screen of computer 150 with a display push button input, which enables Bump control.

Limp mode function 280 is set at maximum output of fifty (50%) percent. The limp mode function 280 is a feature of the computer program operating this device, which allows the operator (under password protection) to retrieve cable 112 when a fault, (non catastrophic) has occurred. This is a safety feature only, and can be used until the proper fix is completed.

Operation will be open loop with no maximum speed and line pull with a proportional-integral-derivative (hereinafter "PID") controller. A proportional-integral-derivative controller (PID controller) is a generic control loop feedback mechanism (controller) widely used in industrial control systems. A PID controller attempts to correct the error between a measured process variable and a desired set point by calculating and then outputting a corrective action that can adjust the process accordingly and rapidly, to keep the error minimal. Limp mode function 280 will be read from the setup screen.

The eeMemory setup values to be made with Service Tool parameter pages. Additional hydraulic power unit parameters for the closed loop pump 136 monitored and actions preferably are:

The hydraulic temperature which has a display value with a warning at 180 degrees Fahrenheit, and shut down at 200 degrees Fahrenheit;

The low fluid level which has a display condition and a shut down at low level after 10 second delay;

The charge pressure which has a display value, with warning at 200 pounds per square inch (hereinafter "psi"), with shutdown at 150 psi, while the engine 128 is at greater than 500 revolutions per minute (hereinafter "RPM") for 30 seconds;

The motor RPM which has a display value;

The suction strainer indicator which has a display condition and a shut down if active and engine 500 RPM for 30 seconds.

The charge filter indicator which has a display condition and shut down if active.

The auxiliary return indicator, which has a display condition and shut down if active.

An ISO (International Organization for Standards) term for the way the different computer systems interface with each other is under the code J1939 (or CAN) available with the engine parameters controlled and monitored. Any standard diesel engine 128 may be used. A diesel engine from John Deere and Company of Moline, Ill. is useful with this system.

Typical useful readouts include:

RPM—Push button for full throttle or to minimum throttle. Push button for throttle up by 50 rpm or down by 50 rpm per button input;

Oil Pressure—Display value, shut down below customer specified value and engine greater than 500 RPM for 30 seconds;

Voltage—Display value, warning at voltage below customer specified value;

Coolant Temp—Display value, warning and shut down at customer specified values;

Fairlead or Level Wind System refers to an open center hydraulic system operated electronically, moving an arm to wind the cable 112 on the drum 120 evenly.

The drum 120 selection is made by an input at the display setup screen 192. The corresponding structure enables the solenoid valve is to energize allowing fairlead control at the drum. A fairlead control joystick 188 (FIG. 4) will be used to operate the fairlead left and right. The fairlead control joystick 188 neutral switch is to be interlocked with fairlead control joystick output 190. Controller output for proportional left and output for proportional right control is based on the fairlead control joystick 188 position.

For the Display Detail, the following parameters are preferred:

The Operation, Information, and J1939 Engine screens will be allowed during operation. Throttle is to be controlled in these screens. The fault screen is to be allowed in neutral and when fault is active. A setup screen is to be allowed in neutral.

Operation Screen:

RPM: Dial showing revolutions per minute (RPM) with adjustment buttons, which are used to throttle up or down. Use the right arrow for bump 50 RPM UP and the left arrow bump 50 RPM DN down.

Line Speed Miles per hour (MPH): Dial showing current speed, with a maximum speed indicator on the dial. The maximum speed to be set with the up or down arrows—enabled when pushing a soft button, entering a password protection screen before making the max speed change.

Line Pull: Dial showing current line pull, with a max line pull indicator on the dial. The max line pull to be set with the up or down arrows—enabled when pushing a soft button 200, entering a password protection screen before making max line pull change.

Text value displaying system hydraulic pressure preferably includes:

Buttons for screen navigation;

Blinking icon for fault, warning, or shutdown;

Drum rope layer;

Drum 120 selection;

Fault Screen Warning or shutdown condition—blink the icon by soft button in operation screen;

Display fault conditions of I/O (input/output) (text with check box);

Information Screen: Warning condition—blink the icon by soft button in operation screen;

Charge pressure pump;

Hydraulic oil temperature;

Fluid level or low oil switch;

Motor 124 RPM;

Suction Strainer indicator;

Charge Filter indicator;

Auxiliary Filter indicator;

Drum with cable diameter;

Set Up Screen with Drum Selection, Bump Control, Limp Mode Enable;

J1939 screen: Warning or shutdown condition—blink the icon by soft button in operation screen;

Voltage;

Coolant Temp;

Oil Pressure.

These readouts may all be coordinated by computer 150, which then directs the appropriate function of the power line puller control package 100. Through the proper algorithm, the function of cable 112 can then be used to install a conductor as a high tension line.

In the following examples, which are intended to illustrate without unduly limiting the scope of this invention, all parts and percentages are by unless otherwise indicated.

Example 1

A 50 mile transmission line is scheduled to be installed. The job consists of 25 separate pulls. On the tenth pull, the conductor becomes jammed in a stringing block. Using the prior art procedure, the linemen performing the work do not realize the problem until the conductor is severely damaged and the pole where the jam occurs becomes twisted by the excessive force. The pulling operation is shut down. The damaged cable is removed causing a delay of two days. A new pole top section is ordered from the pole manufacturer, causing a delay of 60 days, and being delivered to the site, causing a delay of ten days. The damage pole top section is removed and the new section is installed causing a delay of three days. A new conductor is reinstalled causing a delay of two days. In addition, the crews must move ahead to another pull to continue the line pulling operation and return to damaged location to perform the repairs causing an eight-day disruption delay. Total delay equals 85 days. In addition to the excessive delays, this incident causes catastrophic cost failure.

Example 2

A 50 mile transmission line is scheduled to be installed. The job consists of 25 separate pulls. On the tenth pull, the conductor becomes jammed in a stringing block. Using the power line control package 100 of this invention, the puller automatically shuts down when the tension setting is exceeded. A lineman inspects the line and finds the jammed stringing block, the jam is corrected and the pull is restarted. Total delay equals five hours. The costs of this incident are minimal.

This application—taken as a whole with the abstract, specification, claims, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this tool can become clear to a person having ordinary skill in this particular art. Such modifications are clearly covered by this disclosure.

What is claimed and sought to be protected by Letters Patent is:

1. A power line puller control package for facilitating an installation of high tension power lines or conductors comprising:
    a) a support means carrying the power line puller control package;
    b) at least one rope or cable holding drum with a rope or cable supply being mounted on the support means to cooperate with the power line puller control package;
    c) the power line puller control package including a motor operating the at least one rope or cable holding drum;
    d) the at one least rope or cable holding drum being connected to the motor;
    e) a joystick operating the at least one rope or cable holding drum in a forward or a reverse manner; and
    f) the motor adjusting a speed of the drum to maintain a constant rate for the rope or cable supply as the rope or cable supply is retrieved onto the at least one rope or cable holding drum from at least two readouts.

2. The power line puller control package of claim 1 further comprising:
    a) the power line puller control package including a computer to maintain a rate for the rope or cable supply to leave the at least one rope or cable holding drum and a control of the motor;
    b) the computer receiving the at least two readouts to thereby maintain the rate for the rope or cable supply to leave or be applied to the at least one rope or cable holding drum; and
    c) a second rope or cable holding drum being sequentially engaged after a first rope or cable holding drum of the at least one rope or cable holding drum.

3. The power line puller control package of claim 2 further comprising:
    a) a subsequent rope or cable holding drum beyond the first rope or cable holding drum and second rope or cable holding drum being sequentially engaged one at a time as rope or cable is removed therefrom at a substantially uniform rate;
    b) the power line puller control package including a diesel engine, a closed loop pump and a motor;
    c) the diesel engine driving the closed loop pump;
    d) the closed loop pump operating the motor; and
    e) a planetary gear assembly connecting the motor to the at least one rope or cable holding drum.

4. The power line puller control package of claim 3 further comprising:
    a) the motor being an hydraulic motor;
    b) a control program for the computer calculating a line speed and a line pull for the rope or cable from the at least one rope or cable holding drum;
    c) the computer receiving readouts from various parts of the power line puller control package to adjust the line speed and the line pull for the rope or cable holding drum;
    d) a drum sensor measuring a diameter of the rope or cable windings or layers on the at least one rope or cable holding drum; and e) the drum sensor feeding the diameter of the rope or cable windings on the drum to the computer to adjust the line speed and the line pull for the rope or cable holding drum.

5. The power line puller control package of claim 4 further comprising:
   a) the planetary gear assembly being positioned between the brake and the at least one rope or cable holding drum;
   b) the computer receiving and coordinating data from the engine, the closed loop pump, the motor, brake and the drum sensor;
   c) the computer tabulating the data;
   d) the computer adjusting the speed of the drum according to predetermined parameters; and
   e) the computer comparing the data from each source and appropriately applying the motor or the brake as desired, to keep the speed of cable or rope leaving cable or rope holding drum within desired parameters.

6. The power line puller control package of claim 5 further comprising:
   a) the motor selectively operating each rope or cable holding drum of the at least one rope or cable holding drum;
   b) the multi drum power line puller control package being mounted on a flat bed trailer; and
   c) the rope or cable holding drum being engaged one at time.

7. The power line puller control package of claim 6 further comprising:
   a) the flatbed trailer having a support bed and a towing neck;
   b) the engine having engine revolutions per minute with display push buttons and communication values to display engine parameters of miles per hour, pounds per square inch, line pull, and an off or enable switch situated in a central display; and
   c) additional inputs being monitored for warning or shut down conditions of a hydraulic system.

8. The power line puller control package of claim 7 further comprising:
   a) the puller having an enable switch which must be on to allow the drum to operate;
   b) the joystick being a center lock, friction held joystick operating the drum in a forward or a reverse manner; and
   c) the center lock, friction held joystick including a neutral switch interlocking with a joystick output to provide an adjustable maximum line pull or maximum line speed.

9. A power line puller control package for facilitating an installation of high tension power lines comprising:
   a) a support means carrying the power line puller control package;
   b) at least one rope or cable holding drum with a rope or cable supply being mounted on the support means to cooperate with the power line puller control package;
   c) the power line puller control package including a motor operating the at least one rope or cable holding drum;
   d) a first rope or cable holding drum of the at least one rope or cable holding drum being connected to the motor;
   e) the motor adjusting a speed of the drum to maintain a constant rate for the rope or cable supply to leave the at least one rope or cable holding drum from at least two readouts;
   f) a joystick operating the at least one rope or cable holding drum in a forward or a reverse manner; and
   g) the rope or cable supply being suitable for high tension electric lines.

10. The power line puller control package of claim 9 further comprising:
   a) the power line puller control package including a computer to maintain a rate for the rope or cable supply to leave the at least one rope or cable holding drum and a control of the motor;
   b) the computer receiving the at least two readouts to maintain the rate for the rope or cable supply to leave the at least one rope or cable holding drum; and
   c) a second rope or cable holding drum of the at least one rope or cable holding drum being sequentially engaged after the first rope or cable holding drum.

11. The power line puller control package of claim 10 further comprising:
   a) a subsequent rope or cable holding drum of the at least one rope or cable drum being sequentially engaged one at a time as rope or cable is removed from the at least one rope or cable holding drum at a substantially uniform rate;
   b) the power line puller control package including a diesel engine, a closed loop pump and a motor;
   c) the diesel engine driving the closed loop pump;
   d) the closed loop pump operating the motor; and
   e) a planetary gear assembly connecting the motor to the at least one rope or cable holding drum.

12. The power line puller control package of claim 11 further comprising:
   a) the motor being an electric motor;
   b) a control program for the computer calculating a line speed and a line pull for the rope or cable from the at least one rope or cable holding drum;
   c) the computer receiving readouts from various parts of the power line puller control package to adjust the line speed and the line pull for the at least one rope or cable holding drum;
   d) a drum sensor measuring a diameter of the rope or cable on the at least one rope or cable holding drum; and
   e) the drum sensor feeding the diameter of the to the computer to adjust the line speed and the line pull for the at least one rope or cable holding drum.

13. The power line puller control package of claim 12 further comprising:
   a) the planetary gear assembly being positioned between the brake and the at least one rope or cable holding drum and the planetary gear assembly;
   b) the computer receiving and coordinating data from the engine, the closed loop pump, the motor, the brake and the drum sensor;
   c) the computer tabulating the data;
   d) the computer adjusting the speed of the drum is adjusted according to predetermined parameters; and
   e) the computer comparing the data from each source and appropriately applying the motor or the brake as desired, to keep the speed of rope or cable leaving the at least one rope or cable holding drum.

14. The power line puller control package of claim 13 further comprising:
   a) the motor selectively operating each rope or cable holding drum of the at least one rope or cable holding drum;
   b) the multi drum power line puller control package being mounted on a flat bed trailer; and
   c) the rope or cable holding drum being engaged one at time.

15. The power line puller control package of claim 14 further comprising:
   a) the flatbed trailer having a support bed and a towing neck;
   b) the engine having engine revolutions per minute with display push buttons and communication values to display engine parameters of miles per hour, pounds per square inch, line pull, and an off or enable switch situated in a central display; and c) additional inputs being monitored for warning or shut down conditions of a hydraulic system.

16. A power line puller control package for facilitating an installation of high tension power lines or conductors comprising:

a support means carrying the power line puller control package;

at least one rope or cable holding drum with a rope or cable supply being mounted on the support means to cooperate with the power line puller control package;

the power line puller control package including a motor operating the at least one rope or cable holding drum;

the at one least rope or cable holding drum being connected to the motor;

the motor adjusting a speed of the drum to maintain a constant rate for the rope or cable supply as the rope or cable supply is retrieved onto the at least one rope or cable holding drum from at least two readouts;

the power line puller control package including a computer to maintain a rate for the rope or cable supply to leave the at least one rope or cable holding drum and a control of the motor;

the computer receiving the at least two readouts to thereby maintain the rate for the rope or cable supply to leave or be applied to the at least one rope or cable holding drum;

a second rope or cable holding drum being sequentially engaged after a first rope or cable holding drum of the at least one rope or cable holding drum;

a subsequent rope or cable holding drum beyond the first rope or cable holding drum and second rope or cable holding drum being sequentially engaged one at a time as rope or cable is removed therefrom at a substantially uniform rate;

the power line puller control package including a diesel engine, a closed loop pump and a motor;

the diesel engine driving the closed loop pump;

the closed loop pump operating the motor;

a planetary gear assembly connecting the motor to the at least one rope or cable holding drum;

the motor being an hydraulic motor;

a control program for the computer calculating a line speed and a line pull for the rope or cable from the at least one rope or cable holding drum;

the computer receiving readouts from various parts of the power line puller control package to adjust the line speed and the line pull for the rope or cable holding drum;

a drum sensor measuring a diameter of the rope or cable windings or layers on the at least one rope or cable holding drum;

the drum sensor feeding the diameter of the rope or cable windings on the drum to the computer to adjust the line speed and the line pull for the rope or cable holding drum;

the planetary gear assembly being positioned between the brake and the at least one rope or cable holding drum;

the computer receiving and coordinating data from the engine, the closed loop pump, the motor, brake and the drum sensor;

the computer tabulating the data;

the computer adjusting the speed of the drum according to predetermined parameters;

the computer comparing the data from each source and appropriately applying the motor or the brake as desired, to keep the speed of cable or rope leaving cable or rope holding drum within desired parameters;

the motor selectively operating each rope or cable holding drum of the at least one rope or cable holding drum;

the multi drum power line puller control package being mounted on a flat bed trailer;

the rope or cable holding drum being engaged one at a time;

the flatbed trailer having a support bed and a towing neck;

the engine having engine revolutions per minute with display push buttons and communication values to display engine parameters of miles per hour, pounds per square inch, line pull, and an off or enable switch situated in a central display;

additional inputs being monitored for warning or shut down conditions of a hydraulic system;

the puller having an enable switch which must be on to allow the drum to operate;

a center lock, friction held joystick operating the drum in a forward or a reverse manner; and the center lock, friction held joystick including a neutral switch interlocking with a joystick output to provide an adjustable maximum line pull or maximum line speed.

17. A power line puller control package for facilitating an installation of high tension power lines comprising:

a support means carrying the power line puller control package;

at least one rope or cable holding drum with a rope or cable supply being mounted on the support means to cooperate with the power line puller control package;

the power line puller control package including a motor operating the at least one rope or cable holding drum;

a first rope or cable holding drum of the at least one rope or cable holding drum being connected to the motor;

the motor adjusting a speed of the drum to maintain a rate for the rope or cable supply to leave the at least one rope or cable holding drum from at least two readouts;

the rope or cable supply being suitable for high tension electric lines;

the power line puller control package including a computer to maintain a rate for the rope or cable supply to leave the at least one rope or cable holding drum and a control of the motor;

the computer receiving the at least two readouts to maintain the rate for the rope or cable supply to leave at the least one rope or cable holding drum;

a second rope or cable holding drum of the at least one rope or cable holding drum being sequentially engaged after the first rope or cable holding drum;

a subsequent rope or cable holding drum of the at least one rope or cable drum being sequentially engaged one at a time as rope or cable is removed from the at least one rope or cable holding drum at a substantially uniform rate;

the power line puller control package including a diesel engine, a closed loop pump and a motor;

the diesel engine driving the closed loop pump;

the closed loop pump operating the motor;

a planetary gear assembly connecting the motor to the at least one rope or cable holding drum;

the motor being an electric motor;

a control program for the computer calculating a line speed and a line pull for the rope or cable from the at least one rope or cable holding drum;

the computer receiving readouts from various parts of the power line puller control package to adjust the line speed and the line pull for the at least one rope or cable holding drum;

a drum sensor measuring a diameter of the rope or cable on the at least one rope or cable holding drum;

the drum sensor feeding the diameter of the to the computer to adjust the line speed and the line pull for the at least one rope or cable holding drum;

the planetary gear assembly being positioned between the brake and the at least one rope or cable holding drum and the planetary gear assembly;

the computer receiving and coordinating data from the engine, the closed loop pump, the motor, the brake and the drum sensor;

the computer tabulating the data;

the computer adjusting the speed of the drum is adjusted according to predetermined parameters;

the computer comparing the data from each source and appropriately applying the motor or the brake as desired, to keep the speed of rope or cable leaving the at least one rope or cable holding drum;

the motor selectively operating each rope or cable holding drum of the at least one rope or cable holding drum;

the multi drum power line puller control package being mounted on a flat bed trailer;

the rope or cable holding drum being engaged one at time;

the flatbed trailer having a support bed and a towing neck;

the engine having engine revolutions per minute with display push buttons and communication values to display engine parameters of miles per hour, pounds per square inch, line pull, and an off or enable switch situated in a central display;

additional inputs being monitored for warning or shut down conditions of a hydraulic system;

the puller having an enable switch which must be on to allow the drum to operate;

a center lock, friction held joystick operating the drum in a forward or a reverse manner; and the center lock, friction held joystick including a neutral switch interlocking with a joystick output to provide an adjustable maximum line pull or maximum line speed.

18. The power line puller control package of claim 8 or claim 16, further comprising:
   a) the hydraulic system including a limp mode;
   b) the limp mode being password protectable; and
   c) the cable diameter being measured by an ultrasonic drum sensor.

19. The power line puller control package of claim 18 further comprising:
   a) the hydraulic system having hydraulic pressure measured with a pressure transducer;
   b) a motor speed being measured with an electromagnetic pulse pick-up unit;
   c) a set of memory variables for the motor further including motor displacement, drive ratio, drum diameter, rope diameter, and efficiency multiplier;
   d) a bump input assisting engagement of the at least one cable or rope holding drum; and
   e) a proportional-integral-derivative controller providing a generic control loop feedback mechanism.

20. The power line puller control package of claim 19 further comprising:
   a) the proportional-integral-derivative controller providing an error correction between at least one measured process variable and a desired set point by calculating and then outputting a corrective action;
   b) a hydraulic temperature measurement providing a control with a warning at 180 degrees Fahrenheit, and shut down at 200 degrees Fahrenheit;
   c) a low fluid level having a display condition; and
   d) the rope or cable holding drum selection being made by an input at a display setup screen.

21. The power line puller control package of claim 15 or claim 17 further comprising:
   a) the puller having an enable switch which must be on to allow the drum to operate;
   b) the joy stick being a center lock, friction held joystick operating the drum in a forward or a reverse manner; and
   c) the center lock, friction held joystick including a neutral switch interlocking with a joystick output to provide an adjustable maximum line pull or maximum line speed.

22. The power line puller control package of claim 21, further comprising:
   a) the hydraulic system including a limp mode;
   b) the limp mode being password protectable;
   c) the cable winding diameter being measured by an ultrasonic drum sensor;
   d) the hydraulic system having hydraulic pressure measured with a pressure transducer;
   e) a motor speed being measured with an electromagnetic pulse pick-up unit;
   f) a set of memory variables for the motor further including motor displacement, drive ratio, drum diameter, rope diameter, and efficiency multiplier;
   g) a bump input assisting engagement of the at least one rope or cable holding drum;
   h) a proportional-integral-derivative controller providing a generic control loop feedback mechanism;
   i) the proportional-integral-derivative controller providing an error correction for between at least one measured process variable and a desired set point by calculating and then outputting a corrective action;
   j) a hydraulic temperature measurement providing a control with a warning at 180 degrees Fahrenheit, and shut down at 200 degrees Fahrenheit;
   k) a low fluid level having a display condition; and
   l) the rope or cable holding drum selection being made by an input at a display setup screen.

\* \* \* \* \*